United States Patent
Xu et al.

(10) Patent No.: US 12,142,977 B2
(45) Date of Patent: Nov. 12, 2024

(54) COMBINED MULTIFUNCTIONAL DOUBLE-ROTOR MOTOR

(71) Applicant: Zhangjiagang Huajie Electronic Co., Ltd., Zhangjiagang (CN)

(72) Inventors: Yaqing Xu, Zhangjiagang (CN); Yazhou Lu, Zhangjiagang (CN)

(73) Assignee: Zhangjiagang Huajie Electronic Co., Ltd., Zhangjiagang (CN)

( * ) Notice: Subject to any disclaimer, the term of this patent is extended or adjusted under 35 U.S.C. 154(b) by 232 days.

(21) Appl. No.: 18/071,645

(22) Filed: Nov. 30, 2022

(65) Prior Publication Data
US 2023/0421031 A1    Dec. 28, 2023

(30) Foreign Application Priority Data
Jun. 24, 2022    (CN) .......................... 202210720571.7

(51) Int. Cl.
*H02K 16/02*    (2006.01)
*H02K 7/00*    (2006.01)
*H02K 7/08*    (2006.01)

(52) U.S. Cl.
CPC ............. *H02K 16/02* (2013.01); *H02K 7/003* (2013.01); *H02K 7/083* (2013.01)

(58) Field of Classification Search
CPC ..................................................... H02K 16/02
See application file for complete search history.

(56) References Cited

U.S. PATENT DOCUMENTS

| | | | | |
|---|---|---|---|---|
| 2015/0128739 | A1* | 5/2015 | Yoon ....................... | D06F 37/30 74/421 A |
| 2016/0130739 | A1* | 5/2016 | Song ...................... | H02K 16/02 68/133 |
| 2016/0218584 | A1* | 7/2016 | Fukushima ............ | H02K 5/225 |
| 2017/0070106 | A1* | 3/2017 | Guo ....................... | H02K 1/187 |

(Continued)

FOREIGN PATENT DOCUMENTS

| | | |
|---|---|---|
| CN | 102877270 A | 1/2013 |
| CN | 104099754 A | 10/2014 |

(Continued)

OTHER PUBLICATIONS

Barrgawa (CN 109487500 A) English Translation (Year: 2019).*

*Primary Examiner* — Tulsidas C Patel
*Assistant Examiner* — Robert E Mates
(74) *Attorney, Agent, or Firm* — Bayramoglu Law Offices LLC

(57) ABSTRACT

A combined multifunctional double-rotor motor includes a housing, a first output shaft, a first rotor assembly, and a first stator assembly. The first stator assembly and the first rotor assembly are arranged opposite and separated from each other, and the front end of the first output shaft extends out of the housing. A second stator assembly is detachably connected to the rear part of the housing. The first output shaft is hollow, and a second output shaft is coaxially and rotatably arranged in the first output shaft. The rear end of the second output shaft is fixedly connected to a bowl-shaped casing having a front end opening, and the casing is located outside the housing. The second stator assembly is located in the casing, and the inner sidewall of the casing is fixedly provided with outer rotor magnetic tiles corresponding to the second stator assembly.

8 Claims, 3 Drawing Sheets

(56) References Cited

U.S. PATENT DOCUMENTS

| | | | |
|---|---|---|---|
| 2017/0117784 A1* | 4/2017 | Guo | H02K 19/24 |
| 2019/0068035 A1* | 2/2019 | Koizumi | H02K 16/00 |
| 2023/0043424 A1* | 2/2023 | Lehmann | H02K 5/203 |

FOREIGN PATENT DOCUMENTS

| | | | | |
|---|---|---|---|---|
| CN | 109487500 A | * | 3/2019 | D06F 37/304 |
| CN | 114465433 A | | 5/2022 | |
| WO | WO-2021110199 A1 | * | 6/2021 | H02K 16/02 |

* cited by examiner

COMBINED MULTIFUNCTIONAL DOUBLE-ROTOR MOTOR

CROSS REFERENCE TO THE RELATED APPLICATIONS

This application is based upon and claims priority to Chinese Patent Application No. 202210720571.7, filed on Jun. 24, 2022, the entire contents of which are incorporated herein by reference.

TECHNICAL FIELD

The present invention belongs to the technical field of motors and more particularly to a combined multifunctional double-rotor motor.

BACKGROUND

The stator of the double-rotor motor is usually integrated with the double-rotor motor, which is difficult to produce and install. The stator of the double-rotor motor further has severe electromagnetic interference, which affects the rotation stability of the motor, increasing energy consumption, and motor heating. Moreover, the double-rotor motor has a narrow application range and is essentially a custom product with a single function, which is difficult to recycle and utilize.

SUMMARY

The technical problem to be solved by the present invention is to provide a combined multifunctional double-rotor motor, which can solve the technical problems of difficulty in stator production and installation, difficulty in whole machine assembly, mutual interference between internal and external electromagnetic fields, single driving mode, difficulty in recycling and utilization, etc.

To solve the above technical problems, the technical solution of the present invention is as follows: A combined multifunctional double-rotor motor includes a housing, a first output shaft inserted in the housing and rotatably connected to the front end and the rear end of the housing, a first rotor assembly located in the housing and fixedly sleeved on the first output shaft, and a first stator assembly fixed on the inner wall of the housing. The first stator assembly and the first rotor assembly are arranged opposite each other and separated from each other, and the front end of the first output shaft extends out of the housing. A second stator assembly is detachably connected to the rear part of the housing. The first output shaft is hollow; a second output shaft is coaxially and rotatably arranged in the first output shaft. The rear end of the second output shaft is fixedly connected to a bowl-shaped casing having a front end opening, and the casing is located outside the housing. The second stator assembly is located in the casing, and the inner sidewall of the casing is fixedly provided with outer rotor magnetic tiles corresponding to the second stator assembly. The outer rotor magnetic tiles are circumferentially and successively arranged along the inner sidewall of the casing. The front end of the second output shaft extends out of the front end of the first output shaft.

As a preferred solution, the first stator assembly is located in front of the second stator assembly. The first stator assembly includes a first stator iron core with an inner tooth type and a plurality of first windings circumferentially and evenly distributed on the inner side of the first stator iron core. The first rotor assembly includes a first rotor iron core coaxially sleeved on the first output shaft and a plurality of inner rotor magnetic tiles affixed to an outer circumferential wall of the first rotor iron core. The plurality of inner rotor magnetic tiles are successively arranged along a circumferential direction of the first rotor iron core, and the inner rotor magnetic tiles are in one-to-one correspondence with the first windings. The second stator assembly includes an annular support, a second stator iron core with an outer tooth type fixedly connected to the support, and a plurality of second windings circumferentially and evenly distributed on the outer side of the second stator iron core. The support is detachably fixed on the housing, and the second windings are in one-to-one correspondence with the outer rotor magnetic tiles.

As a preferred solution, the housing includes a front end cover and a rear end cover. The rear end of the front end cover is buckled on the outer edge of the front end of the first stator iron core. The front end of the rear end cover is buckled on the outer edge of the rear end of the first stator iron core. A heat dissipation hollow area is provided between the front end cover and the rear end cover for heat dissipation of the first stator iron core. The outer edge of the rear end of the front end cover is connected to an everted front flange ring, and the outer edge of the front end of the rear end cover is connected to an everted rear flange ring. The front flange ring and the rear flange ring are connected by a bolt.

As a preferred solution, the second stator assembly further includes a connection ring integrated on the inner wall of the front part of the support. The connection ring is matched with the rear flange ring, and the connection ring is attached to the rear end surface of the rear flange ring through the bolt.

As a preferred solution, a plurality of positioning holes is formed in the rear end surface of the rear end cover. The inner wall of the rear part of the support is connected to a positioning ring, and the positioning ring is located behind a rear end plate of the rear end cover. The positioning ring is provided with positioning columns in one-to-one correspondence with the positioning holes, and the positioning columns are correspondingly inserted into the positioning holes.

As a preferred solution, the front end surface of the connection ring is further integrated with a positioning sleeve matched with the rear flange ring, and the positioning sleeve is sleeved outside the rear flange ring.

As a preferred solution, the inner wall of the front end plate of the front end cover is integrated with a first bearing sleeve arranged coaxially with the first output shaft, and a first bearing is embedded in the first bearing sleeve. The inner wall of the rear end plate of the rear end cover is integrated with a second bearing sleeve arranged coaxially with the first output shaft, and a second bearing is embedded in the second bearing sleeve. The first bearing and the second bearing are respectively sleeved on the first output shaft so that the first output shaft is rotatably connected to the housing. The front end of the first output shaft is provided with an assembly hole with a diameter greater than the center hole of the first output shaft, and a third bearing is assembled in the assembly hole. The outer wall of the rear end plate of the rear end cover is integrated with a third bearing sleeve arranged coaxially with the second output shaft, and a fourth bearing is embedded in the third bearing sleeve. The third bearing and the fourth bearing are respectively sleeved on the second output shaft so that the front end of the second output shaft is rotatably connected to the first output shaft, and the rear end of the second output shaft is rotatably connected to the housing.

As a preferred solution, the outer wall of the front end plate of the front end cover is integrated with a sealing tube arranged coaxially with the first output shaft. The front end of the sealing tube is connected to a sealing sleeve, and the sealing sleeve is inserted between the sealing tube and the first output shaft so that the first output shaft is hermetically connected to the front end cover.

As a preferred solution, the casing includes a bowl-shaped main body part having a front end opening and an annular magnetic conduction part fixedly connected to the front end of the main body part. The outer rotor magnetic tiles are affixed to the inner wall of the annular magnetic conduction part.

The advantages of the present invention are as follows: In the present invention, the difficulty of stator production is reduced by producing the first stator assembly and the second stator assembly independently and respectively, and the assembly difficulty of the motor is reduced by simplifying the stator connection mode through connecting the second stator assembly and the housing with a detachable connection mode. The separation of the first stator assembly and the second stator assembly reduces the mutual interference of the electromagnetic field between them, which improves the output stability of the motor and reduces the energy consumption due to electromagnetic field interference. The first stator assembly and the second stator assembly work independently, which can realize a variety of output modes and drive modes of the double-rotor motor. The connection mode between the second stator assembly and the housing makes the double-rotor motor of the present invention have a high recovery rate. After the second stator assembly, the second output shaft, the casing, and the outer rotor magnetic tiles are removed, the motor can be used as a single-rotor motor.

BRIEF DESCRIPTION OF THE DRAWINGS

The specific embodiments of the present invention are further described in detail in combination with the drawings.

In FIGS. 1-4: 1. housing; 101. front end cover; 101a. front end plate; 101b. first bearing sleeve; 101c. sealing tube; 102. rear end cover; 102a. rear end plate; 102b. second bearing sleeve; 102c. third bearing sleeve; 103. heat dissipation hollow area; 104. front flange ring; 105. rear flange ring; 106. bolt; 2. first output shaft; 201. assembly hole; 3. first rotor assembly; 301. first rotor iron core; 302. inner rotor magnetic tile; 4. first stator assembly; 401. first stator iron core; 402. first winding; 5. second stator assembly; 501. support; 502. second stator iron core; 503. second winding; 504. connection ring; 505. positioning ring; 506. positioning sleeve; 6. second output shaft; 7. casing; 701. main body part; 702. magnetic conduction part; 8. outer rotor magnetic tile; 9. positioning hole; 10. positioning column; 11. first bearing; 12. second bearing; 13. third bearing; 14. fourth bearing; 15. sealing sleeve; 16. first groove; 17. second groove; 18. wave wheel; 19. centrifugal cylinder; 20. mounting plate; and 21. clamping ring.

DETAILED DESCRIPTION OF THE EMBODIMENTS

The specific embodiments of the present invention are described in detail below in combination with the drawings.

Figure 1:
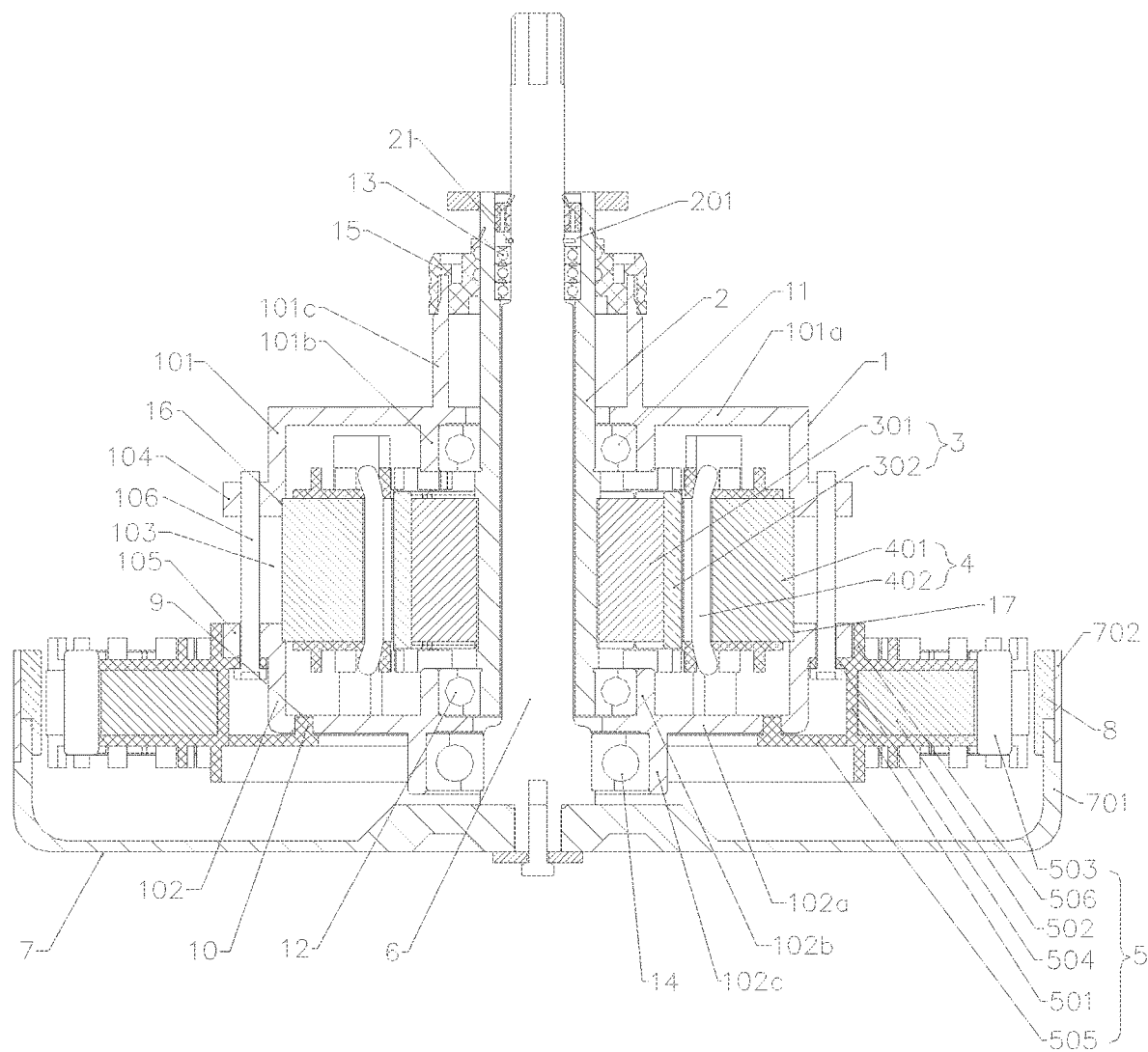
FIG. 1 is a schematic diagram showing a cross-section of the structure of a double-rotor motor according to the present invention.

The front in the embodiment refers to the direction towards the output end of the first output shaft 2 or the second output shaft 6 of the double-rotor motor as shown in FIG. 1, and the rear refers to the direction towards the rear end cover of the double-rotor motor as shown in FIG. 1.

Figure 2:
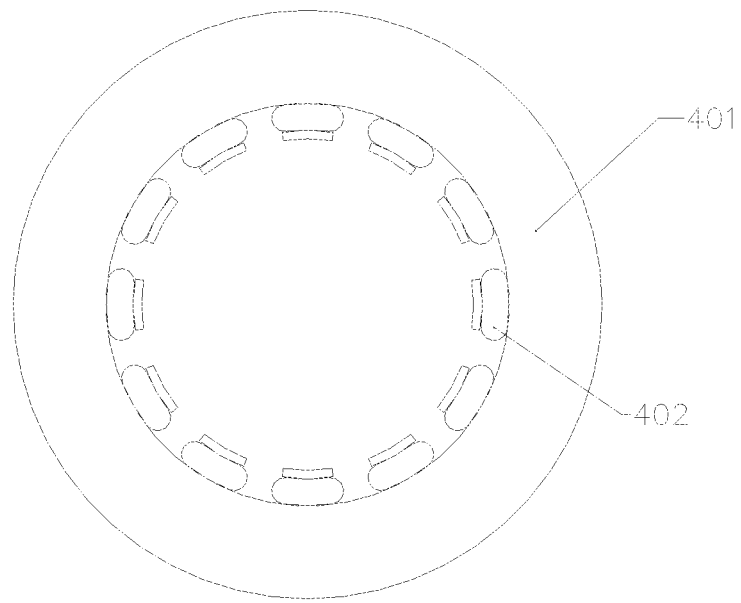
FIG. 2 is a schematic diagram showing the connection structure between a first stator iron core and a first winding according to the present invention.
Figure 3:
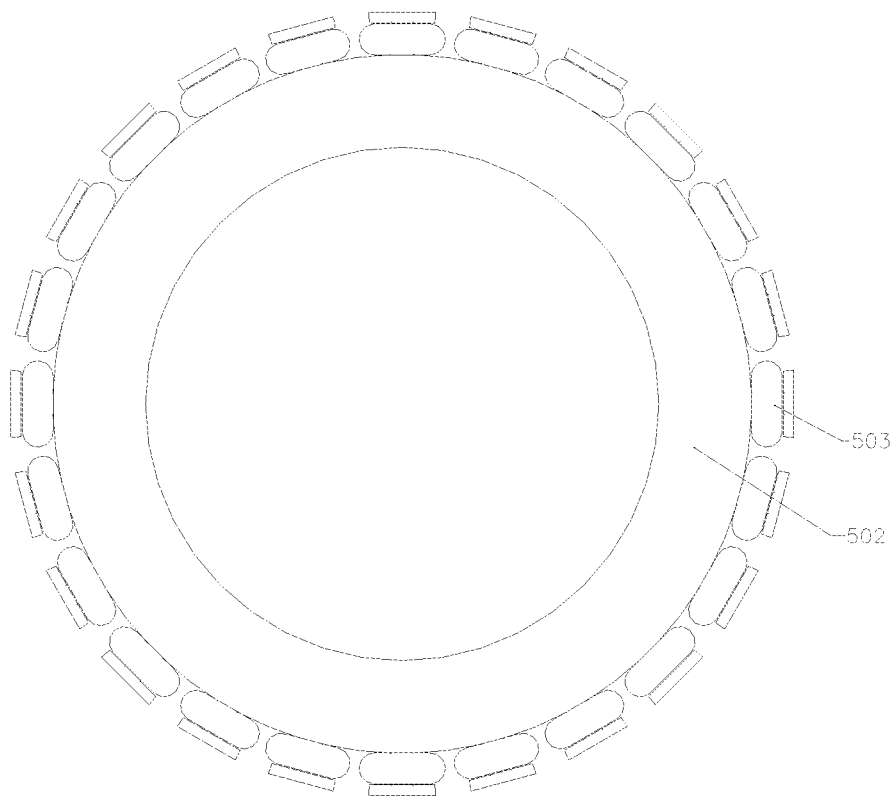
FIG. 3 is a schematic diagram showing the connection structure between a second stator iron core and a second winding according to the present invention.

As shown in FIGS. 1-3, a combined multifunctional double-rotor motor includes the housing 1, the first output shaft 2 inserted in the housing 1 and rotatably connected to the front end and the rear end of the housing 1, the first rotor assembly 3 located in the housing 1 and fixedly sleeved on the first output shaft 2, and the first stator assembly 4 fixed on the inner wall of the housing 1. The first stator assembly 4 and the first rotor assembly 3 are arranged opposite each other and separated from each other, and the front end of the first output shaft 2 extends out of the housing 1. The second stator assembly 5 is detachably connected to the rear part of the housing 1 using a bolt connection, a thread connection, or others, and the bolt connection is preferred in the embodiment. The first output shaft 2 is hollow, and the second output shaft 6 is coaxially and rotatably arranged in the first output shaft 2. Both the front end and the rear end of the second output shaft 6 extend out of the first output shaft 2, and the rear end of the second output shaft 6 penetrates through the rear end cover 102 of the housing 1 and is exposed. The rear end of the second output shaft 6 is fixedly connected to the bowl-shaped casing 7 having a front end opening, and the casing 7 is located outside the housing 1. The second stator assembly 5 is located in the casing 7, and the inner sidewall of the casing 7 is fixedly provided with the outer rotor magnetic tiles 8 corresponding to the second stator assembly 5. The outer rotor magnetic tiles 8 are circumferentially and successively arranged along the inner sidewall of the casing 7. The front end of the second output shaft 6 extends out of the front end of the first output shaft 2.

In the embodiment, the casing 7 can be made of materials with excellent magnetic conductivity, such as steel, iron, and the like.

To further reduce the weight of the casing 7, in the embodiment, preferably, the casing 7 includes the bowl-shaped main body part 701 having a front end opening and the annular magnetic conduction part 702 fixedly connected to the front end of the main body part 701. The main body part 701 can be made of lightweight materials, such as plastic, aluminum, and the like. The magnetic conduction part 702 is made of magnetic materials, such as iron, silicon steel, and the like. The outer rotor magnetic tiles 8 are affixed to the inner wall of the annular magnetic conduction part 702.

In the embodiment, the housing 1, the first output shaft 2, the first rotor assembly 3, and the first stator assembly 4 form a complete set of single-rotor motor that can be applied independently. On this basis, the second stator assembly 5, the second output shaft 6, the casing 7, and the outer rotor magnetic tiles 8 are added to form another complete set of single-rotor motor that can be driven separately. The two sets of single-rotor motors are combined into a double-rotor motor through a coaxial rotation connection of the first output shaft 2 and the second output shaft 6. Since the first output shaft 2 and the second output shaft 6 can be driven independently and respectively, the double-rotor motor described in the embodiment can realize multiple output modes such as the same direction output, the reverse direction output, the synchronous output, the asynchronous output, and the independent output between the first output shaft 2 and the second output shaft 6, thereby greatly enriching the output function of the double-rotor motor. The double-rotor motor with the aforementioned structure is also convenient for recycling. After the second stator assembly 5 and the second output shaft 6 are removed, the double-rotor motor can be used as a single-rotor motor independently. This also greatly increases the scope of application of the double-rotor motor described in the embodiment.

The first stator assembly 4 and the second stator assembly 5 are separated from each other, which greatly reduces the electromagnetic interference between the first stator assembly 4 and the second stator assembly 5 and improves the output stability of the double-rotor motor.

In the embodiment, preferably, the first stator assembly 4 is arranged in front of the second stator assembly 5, so that the misplacement of the first stator assembly 4 and the second stator assembly 5 further reduces the electromagnetic interference between the first stator assembly 4 and the second stator assembly 5 and further improves the output stability of the double-rotor motor.

In the embodiment, as shown in FIG. 2, the first stator assembly 4 includes the first stator iron core 401 with an inner tooth type and a plurality of first windings 402 circumferentially and evenly distributed on the inner side of the first stator iron core 401. The first rotor assembly 3 includes the first rotor iron core 301 coaxially sleeved on the first output shaft 2 and a plurality of inner rotor magnetic tiles 302 affixed to the outer circumferential wall of the first rotor iron core 301. The plurality of inner rotor magnetic tiles 302 are successively arranged at an equal interval along the circumferential direction of the first rotor iron core 301, and the inner rotor magnetic tiles 302 are in one-to-one correspondence with the first windings 402. The second stator assembly 5 includes the annular support 501, the second stator iron core 502 with an outer tooth type fixedly connected to the support 501, and a plurality of second windings 503 circumferentially and evenly distributed on the outer side of the second stator iron core 502. The support 501 is detachably fixed on the housing 1, and the second windings 503 are in one-to-one correspondence with the outer rotor magnetic tiles 8.

In the embodiment, the housing 1 includes the front end cover 101 and the rear end cover 102. The rear end of the front end cover 101 is buckled on the outer edge of the front end of the first stator iron core 401, and the front end of the first output shaft 2 penetrates through the front end cover 101. The front end of the rear end cover 102 is buckled on the outer edge of the rear end of the first stator iron core 401. The heat dissipation hollow area 103 is provided between the front end cover 101 and the rear end cover 102 for the heat dissipation of the first stator iron core 401. The outer edge of the rear end of the front end cover 101 is connected to the everted front flange ring 104, and the outer edge of the front end of the rear end cover 102 is connected to the everted rear flange ring 105. The front flange ring 104 and the rear flange ring 105 are connected by the bolt 106. The second stator assembly 5 further includes the connection ring 504 integrated on the inner wall of the front part of the support 501. The connection ring 504 is matched with the rear flange ring 105, and the connection ring 504 is attached to the rear end surface of the rear flange ring 105 through the bolt 106 to realize the detachable connection between the second stator assembly 5 and the housing 1.

The connection ring 504 and the rear flange ring 105 can be connected by using the bolt 106 independently, or they can be connected with the front flange ring 104 by sharing the same bolt 106. Preferably, the bolt 106 penetrates through the connection ring 504, the rear flange ring 105, and the front flange ring 104 in succession to connect the three, which can simplify the installation structure and improve assembly efficiency.

The specific connection structure of the first stator iron core 401, the front end cover 101, and the rear end cover 102 is as follows: The inner sidewall of the rear end of the front end cover 101 is provided with the annular first groove 16. The first groove 16 axially extends along the first output shaft 2 towards the rear end, and the front end of the first stator iron core 401 is inserted in the first groove 16. The inner sidewall of the front end of the rear end cover 102 is provided with the annular second groove 17. The second groove 17 axially extends along the first output shaft 2 towards the front end, and the rear end of the first stator iron core 401 is inserted in the second groove 17. The first groove 16 is matched with the front end of the first stator iron core 401, and the second groove 17 is matched with the rear end of the first stator iron core 401.

A part of the outer wall of the first stator iron core 401 is in the heat dissipation hollow area 103 for a good heat dissipation effect.

As shown in FIG. 1, in the embodiment, a plurality of positioning holes 9 are formed in the rear end surface of the rear end cover 102 of the housing 1, and preferably, the plurality of positioning holes 9 are circumferentially and evenly distributed. The inner wall of the rear part of the support 501 is connected to the positioning ring 505, and the positioning ring 505 is located behind the rear end plate 102a of the rear end cover 102. The plurality of positioning holes 9 is located in the rear end plate 102a. The positioning ring 505 is provided with the positioning columns 10 in one-to-one correspondence with the positioning holes 9, and the positioning columns 10 are correspondingly inserted into the positioning holes 9, which achieves the positioning of the second stator assembly 5 and the housing 1 and ensures the concentricity of the first stator assembly 4 and the second stator assembly 5.

As shown in FIG. 1, in the embodiment, the front end surface of the connection ring 504 is further integrated with the positioning sleeve 506 matched with the rear flange ring 105, and the positioning sleeve 506 is sleeved outside the rear flange ring 105. The positioning sleeve 506 is further configured for positioning the second stator assembly 5, which further improves the concentricity of the first stator assembly 4 and the second stator assembly 5.

In the embodiment, the specific installation mode of the first output shaft 2 and the second output shaft 6 is as follows: The inner wall of the front end plate 101a of the front end cover 101 is integrated with the first bearing sleeve 101b arranged coaxially with the first output shaft 2, and the first bearing 11 is embedded in the first bearing sleeve 101b. The inner wall of the rear end plate 102a of the rear end cover 102 is integrated with the second bearing sleeve 102b arranged coaxially with the first output shaft 2, and the second bearing 12 is embedded in the second bearing sleeve 102b. The first bearing 11 and the second bearing 12 are respectively sleeved on the first output shaft 2 so that the first output shaft 2 is rotatably connected to the housing 1. The front end of the first output shaft 2 is provided with the assembly hole 201 with a diameter greater than the center hole of the first output shaft 2, and the third bearing 13 is assembled in the assembly hole 201. The outer wall of the rear end plate 102*a* of the rear end cover 102 is integrated with the third bearing sleeve 102*c* arranged coaxially with the second output shaft 6, and the fourth bearing 14 is embedded in the third bearing sleeve 102*c*. The third bearing 13 and the fourth bearing 14 are respectively sleeved on the second output shaft 6 so that the front end of the second output shaft 6 is rotatably connected to the first output shaft 2, and the rear end of the second output shaft 6 is rotatably connected to the housing 1. The clamping ring 21 is detachably fixed on and clamped with the second output shaft 6 located in front of the third bearing 13, and the clamping ring 21 is configured for restricting the axial movement of the second output shaft 6 towards the rear end.

In the embodiment, the second output shaft 6 is driven by the second stator assembly 5 located on the outer side of the second output shaft 6. Due to the large diameter of the second stator assembly 5, the driving force can be increased to provide a greater driving force to the second output shaft 6 so that the second output shaft 6 can output a larger torque, which can effectively improve the power of the wave wheel and the cleaning effect of the washing machine when used in the wave wheel washing machine.

The outer wall of the front end plate 101*a* of the front end cover 101 is integrated with the sealing tube 101*c* arranged coaxially with the first output shaft 2. The sealing tube 101*c* is a part of the front end cover 101. The front end of the sealing tube 101*c* is connected to the sealing sleeve 15, and the sealing sleeve 15 is inserted between the sealing tube 101*c* and the first output shaft 2 so that the first output shaft 2 is hermetically connected to the front end cover 101.

The working principle of the present invention is as follows: As shown in FIGS. 1-3, when the combined multifunctional double-rotor motor of the present invention is in operation, the first stator assembly 4 drives the first rotor assembly 3 to rotate, and the first rotor assembly 3 drives the first output shaft 2 to rotate, forming the first drive output. The second stator assembly 5 drives the outer rotor magnetic tiles 8 and the casing 7 to rotate, and the casing 7 drives the second output shaft 6 to rotate, forming the second drive output. The first drive output and the second drive output do not interfere with each other. During operation, the direction and torque of the first drive output and the direction and torque of the second drive output can be respectively controlled according to the actual needs, which greatly enriches the output mode of the double-rotor motor and increases the function of the double-rotor motor. The second output shaft 6 is coaxially sleeved in the first output shaft 2, which can effectively reduce the distance between the shaft end of the first output shaft 2 and the shaft end of the second output shaft 6.

When the combined multifunctional double-rotor motor of the present invention is idle and needs to be recovered, the clamping ring 21 on the second output shaft 6 is removed first. The second output shaft 6, the casing 7 connected to the rear end of the second output shaft 6, and the outer rotor magnetic tiles 8 are pulled toward the rear end to be separated from the first output shaft 2. The bolt 106 is removed, and the second stator assembly 5 is removed from the rear flange ring 105 of the housing 1. Finally, the bolt 106 is assembled to the initial position to restore the connection between the front end cover 101 and the rear end cover 102 of the housing 1. In this way, the original double-rotor motor can be changed into a single-rotor motor for reuse.

Figure 4:
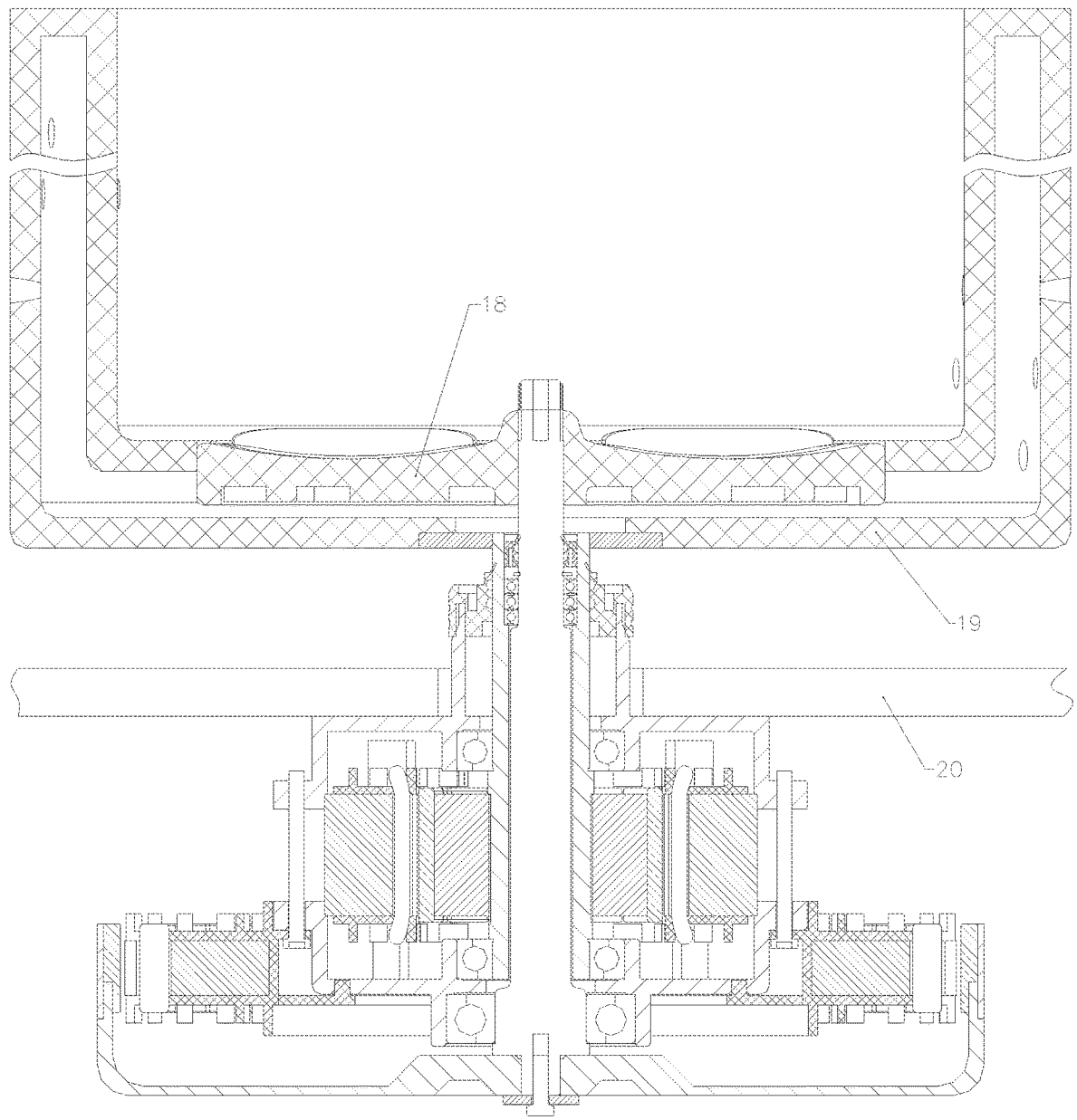
FIG. 4 is a schematic diagram showing the structure of the double-rotor motor applied in a wave wheel washing machine according to the present invention.

Combined with FIG. 1 and FIG. 4, the application of the double-rotor motor in the wave wheel washing machine is taken as an example. When the double-rotor motor of the present invention is in use, the second output shaft 6 is connected to the wave wheel 18 to drive the wave wheel 18 to rotate, and the wave wheel 18 rotates to drive cleaning fluid and clothes in the washing machine cylinder to move, which requires large power. The second stator assembly 5 with a large diameter and the outer rotor magnetic tiles 8 cooperate to provide a large torque to the second output shaft 6, thereby providing large power to the wave wheel 18.

The front end of the first output shaft 2 is connected to the centrifugal cylinder 19 (namely the drying cylinder) of the wave wheel washing machine to drive the centrifugal cylinder 19 to rotate. When the centrifugal cylinder 19 is drying the clothes, the cleaning liquid in the washing machine cylinder is already discharged, leaving only the clothes and the water carried by the clothes so the driving force required is relatively small. The first stator assembly 4 and the first rotor assembly 3 located in the center are configured to drive the centrifugal cylinder 19, which has more reasonable power distribution, lower overall energy consumption, less heat generation, and a higher energy utilization rate.

In the wave wheel washing machine with the double-rotor motor of the present invention, the front end cover 101 of the housing 1 can be connected to the mounting plate 20 inside the wave wheel washing machine through bolts, rivets, or other fasteners, or the mounting plate 20 inside the washing machine can be clamped between the front end cover 101 and the rear end cover 102 and fixed by bolts.

The above embodiments are used to illustrate the principles and advantages of the present invention rather than to limit the present invention. It should be noted that for those having ordinary skill in the art, several modifications and improvements may be made without departing from the idea of the present invention, and these modifications and improvements all shall fall within the scope of protection of the present invention.

What is claimed is:

1. A combined multifunctional double-rotor motor, comprising:
   a housing,
   a first output shaft inserted in the housing and rotatably connected to a front end and a rear end of the housing,
   a first rotor assembly located in the housing and fixedly sleeved on the first output shaft, and
   a first stator assembly fixed on an inner wall of the housing;
   wherein the first stator assembly and the first rotor assembly are arranged opposite each other and separated from each other, and a front end of the first output shaft extends out of the housing; a second stator assembly is detachably connected to a rear part of the housing; the first output shaft is hollow, and a second output shaft is coaxially and rotatably arranged in the first output shaft; a rear end of the second output shaft is fixedly connected to a bowl-shaped casing having a front end opening, and the bowl-shaped casing is located outside the housing; the second stator assembly is located in the bowl-shaped casing, and an inner sidewall of the bowl-shaped casing is fixedly provided with outer rotor magnetic tiles corresponding to the second stator assembly; the outer rotor magnetic tiles are circumferentially and successively arranged along the inner sidewall of the bowl-shaped casing; a front end of the second output shaft extends out of the front end of the first output shaft;

the first stator assembly comprises a first stator iron core with an inner tooth type and a plurality of first windings circumferentially and evenly distributed on an inner side of the first stator iron core;

the first rotor assembly comprises a first rotor iron core coaxially sleeved on the first output shaft and a plurality of inner rotor magnetic tiles affixed to an outer circumferential wall of the first rotor iron core; the plurality of inner rotor magnetic tiles are successively arranged along a circumferential direction of the first rotor iron core, and the plurality of inner rotor magnetic tiles are in one-to-one correspondence with the plurality of first windings;

the housing comprises a front end cover and a rear end cover; a rear end of the front end cover is buckled on an outer edge of a front end of the first stator iron core; a front end of the rear end cover is buckled on an outer edge of a rear end of the first stator iron core; an outer edge of the rear end of the front end cover is connected to an everted front flange ring, and an outer edge of the front end of the rear end cover is connected to an everted rear flange ring; the everted front flange ring and the everted rear flange ring are connected by a bolt;

the second stator assembly comprises an annular support, a second stator iron core with an outer tooth type fixedly connected to the support, and a plurality of second windings circumferentially and evenly distributed on an outer side of the second stator iron core; the support is detachably fixed on the housing, and the second windings are in an one-to-one correspondence with the outer rotor magnetic tiles; and the second stator assembly further comprises a connection ring integrated on an inner wall of a front part of the support; the connection ring is matched with the everted rear flange ring, and the connection ring is attached to a rear end surface of the everted rear flange ring through the bolt.

2. The combined multifunctional double-rotor motor according to claim 1, wherein the first stator assembly is located in front of the second stator assembly.

3. The combined multifunctional double-rotor motor according to claim 2, wherein a heat dissipation hollow area is provided between the front end cover and the rear end cover for a heat dissipation of the first stator iron core.

4. The combined multifunctional double-rotor motor according to claim 3, wherein a plurality of positioning holes are formed in a rear end surface of the rear end cover; an inner wall of a rear part of the annular support is connected to a positioning ring, and the positioning ring is located behind a rear end plate of the rear end cover; the positioning ring is provided with positioning columns in an one-to-one correspondence with the plurality of positioning holes, and the positioning columns are correspondingly inserted into the plurality of positioning holes.

5. The combined multifunctional double-rotor motor according to claim 4, wherein a front end surface of the connection ring is integrated with a positioning sleeve matched with the everted rear flange ring, and the positioning sleeve is sleeved outside the everted rear flange ring.

6. The combined multifunctional double-rotor motor according to claim 4, wherein an inner wall of a front end plate of the front end cover is integrated with a first bearing sleeve arranged coaxially with the first output shaft, and a first bearing is embedded in the first bearing sleeve;

an inner wall of the rear end plate of the rear end cover is integrated with a second bearing sleeve arranged coaxially with the first output shaft, and a second bearing is embedded in the second bearing sleeve;

the first bearing and the second bearing are respectively sleeved on the first output shaft so that the first output shaft is rotatably connected to the housing;

the front end of the first output shaft is provided with an assembly hole, wherein a diameter of the assembly hole is greater than a diameter of a center hole of the first output shaft, and a third bearing is assembled in the assembly hole;

an outer wall of the rear end plate of the rear end cover is integrated with a third bearing sleeve arranged coaxially with the second output shaft, and a fourth bearing is embedded in the third bearing sleeve; and the third bearing and the fourth bearing are respectively sleeved on the second output shaft so that the front end of the second output shaft is rotatably connected to the first output shaft, and the rear end of the second output shaft is rotatably connected to the housing.

7. The combined multifunctional double-rotor motor according to claim 3, wherein an outer wall of a front end plate of the front end cover is integrated with a sealing tube arranged coaxially with the first output shaft; a front end of the sealing tube is connected to a sealing sleeve, and the sealing sleeve is inserted between the sealing tube and the first output shaft so that the first output shaft is hermetically connected to the front end cover.

8. The combined multifunctional double-rotor motor according to claim 1, wherein the bowl-shaped casing comprises a bowl-shaped main body part having a front end opening and an annular magnetic conduction part fixedly connected to a front end of the bowl-shaped main body part; the outer rotor magnetic tiles are affixed to an inner wall of the annular magnetic conduction part.

* * * * *